United States Patent
Hiccox et al.

(10) Patent No.: US 11,004,074 B1
(45) Date of Patent: May 11, 2021

(54) PAYMENT DEVICES WITH ENHANCED SECURITY FEATURES

(71) Applicant: Wells Fargo Bank, N.A., San Francisco, CA (US)

(72) Inventors: Sarah Hiccox, Charlotte, NC (US); Marcia N. Kurtz, Lafayette, CA (US); Chelsea K. McDermott, American Canyon, CA (US); Jenny Y. Tao, Belmont, CA (US); Tiffany N. Twilley, Foster City, CA (US); Michael Tilaro, San Francisco, CA (US); Jonathan E. Hoveland, Charlotte, NC (US); Jay M. Bozicevich, Golden Valley, MN (US)

(73) Assignee: Wells Fargo Bank. N.A., San Francisco, CA (US)

( * ) Notice: Subject to any disclaimer, the term of this patent is extended or adjusted under 35 U.S.C. 154(b) by 822 days.

(21) Appl. No.: 14/951,043

(22) Filed: Nov. 24, 2015

(51) Int. Cl.
| | |
|---|---|
| *G06K 19/06* | (2006.01) |
| *G06K 19/073* | (2006.01) |
| *G06Q 20/40* | (2012.01) |
| *G06Q 30/02* | (2012.01) |

(52) U.S. Cl.
CPC .  *G06Q 20/40145* (2013.01); *G06K 19/06187* (2013.01); *G06K 19/073* (2013.01); *G06Q 30/0226* (2013.01)

(58) Field of Classification Search
CPC ...................................................... G06K 9/00
See application file for complete search history.

(56) References Cited

U.S. PATENT DOCUMENTS

| | | | |
|---|---|---|---|
| 6,163,771 A * | 12/2000 | Walker | G06Q 20/04 |
| | | | 705/18 |
| 7,587,756 B2 | 9/2009 | Peart et al. | |
| 8,820,649 B2 | 9/2014 | Goldman et al. | |
| 8,864,024 B1 | 10/2014 | Cummins et al. | |
| 8,875,998 B2 | 11/2014 | Brennan | |
| 9,652,770 B1 * | 5/2017 | Kurani | G06Q 20/36 |
| 2003/0212629 A1 | 11/2003 | King | |

(Continued)

OTHER PUBLICATIONS

Plastc, "Everything on Plastc: Bring Intelligence to the Way You Pay With Plastc Card", https://plastc.com, 2015, date accessed: Nov. 24, 2015, 8 pages.

*Primary Examiner* — Calvin L Hewitt, II
*Assistant Examiner* — Zehra Raza
(74) *Attorney, Agent, or Firm* — Foley & Lardner LLP

(57) ABSTRACT

A payment device includes a biometric sensor configured to receive a biometric measurement from a user. The payment device also includes a display configured to selectively display sensitive payment account information for a payment account of the user. The payment account is associated with the payment device. The payment device further includes a processor and instructions stored in non-transitory machine-readable media. The instructions are configured to cause the payment device to receive the biometric measurement from the biometric sensor. The user is authenticated if the biometric measurement matches a stored biometric of the user. Upon authenticating the user, the sensitive payment account information is displayed on the display. The sensitive payment account information is removed from the display a first predetermined time period after authenticating the user.

13 Claims, 4 Drawing Sheets

(56) References Cited

U.S. PATENT DOCUMENTS

| | | | | |
|---|---|---|---|---|
| 2011/0047074 A1* | 2/2011 | Cai | ................ | G06Q 20/105 |
| | | | | 705/41 |
| 2011/0208648 A1 | 8/2011 | Alothaimeen | | |
| 2015/0178725 A1* | 6/2015 | Poetsch | ................ | G06Q 20/40 |
| | | | | 705/44 |
| 2015/0262052 A1* | 9/2015 | Pahuja | ................ | G06Q 20/341 |
| | | | | 340/10.52 |
| 2015/0332273 A1* | 11/2015 | Bruno | ................ | G06Q 20/40145 |
| | | | | 705/44 |

* cited by examiner

PAYMENT DEVICES WITH ENHANCED SECURITY FEATURES

BACKGROUND

The present disclosure relates generally to the field of systems and methods for facilitating payment transactions. More specifically, the present disclosure relates to systems and methods for facilitating payment transactions using payment devices with enhanced security features.

Payments for products and services are often completed using credit cards, debit cards, checks, or cash. When a card is lost or stolen (e.g., physically or electronically), it may be used for unauthorized purchases until the holder notifies the issuing bank and the bank puts a block on the account. Still, it is possible for a thief to make unauthorized purchases on a card before the card is canceled. A cardholder could incur significant losses from transactions made before the cardholder or the card issuer realizes that the card has been compromised.

A common security measure on all cards is a signature panel; however, a signature may be relatively easy to forge. Further, some jurisdictions require identification or a signature only for purchases above a certain amount (e.g., $50), unless otherwise stated in the policy of the merchant. Therefore, stolen cards are vulnerable to multiple small-value fraudulent transactions without significant security measures. Another common security measure is to require the user (e.g., customer) to key in some identifying information, such as the user's ZIP code. This method may deter casual theft of a card found alone; however, if the card holder's wallet is stolen, it may be trivial for the thief to deduce the information by looking at other items in the wallet. For instance, a U.S. driver license commonly has the holder's home address and ZIP code printed on it. Accordingly, enhanced card security features would be desirable.

SUMMARY

According to one example embodiment, a payment device includes a biometric sensor configured to receive a biometric measurement from a user. The payment device also includes a display configured to selectively display sensitive payment account information for a payment account of the user. The payment account is associated with the payment device. The payment device further includes a processor and instructions stored in non-transitory machine-readable media. The instructions are configured to cause the payment device to receive the biometric measurement from the biometric sensor. The user is authenticated if the biometric measurement matches a stored biometric of the user. Upon authenticating the user, the sensitive payment account information is displayed on the display. The sensitive payment account information is removed from the display a first predetermined time period after authenticating the user.

According to another example embodiment, a computer-implemented method is performed by a payment device. The payment device has a processor and non-transitory computer-readable media. The payment device is associated with a payment account of a user. A biometric of the user is measured. The user is authenticated if the biometric measurement matches a stored biometric of the user. Sensitive payment account information is displayed on the display upon authenticating the user. The sensitive payment account information relates to the payment account of the user. The sensitive payment account information is removed from the display a first predetermined time period after authenticating the user.

According to another example embodiment, a payment system includes a payment device account associated with a first user of the payment system. The payment device account includes an associated payment account and biometric of the first user. The payment system also includes a payment device. A server system includes a processor and instructions stored in non-transitory machine-readable media. The instructions are configured to cause the server system to receive a biometric measurement from a payment device. The server system verifies that the received biometric measurement matches the biometric of the first user. Payment account information relating to the payment device account of the first user is transmitted to the payment device. The payment device is operable by the first user to conduct transactions involving the first user's payment account. The payment account information is deleted from the payment device a predetermined time after the payment account information is transmitted to the payment device. The payment device is subsequently reprogrammable with payment account information relating to a payment device account of a second user.

According to another example embodiment, a computer-implemented method is performed by a payment system. The payment system has a processor and non-transitory computer-readable media. A payment device account is associated with a first user of the payment system. The payment device account includes an associated payment account and biometric of the first user. A biometric measurement is received from a payment device. It is verified that the received biometric measurement matches the biometric of the first user. Payment account information relating to the payment device account of the first user is transmitted to the payment device. The payment device is operable by the first user to conduct payments from the first user's payment account. The payment account information is deleted from the payment device a predetermined time after the payment account information is transmitted to the payment device. The payment device is subsequently reprogrammable with payment account information relating to a payment device account of a second user.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

DETAILED DESCRIPTION

Figure 1:
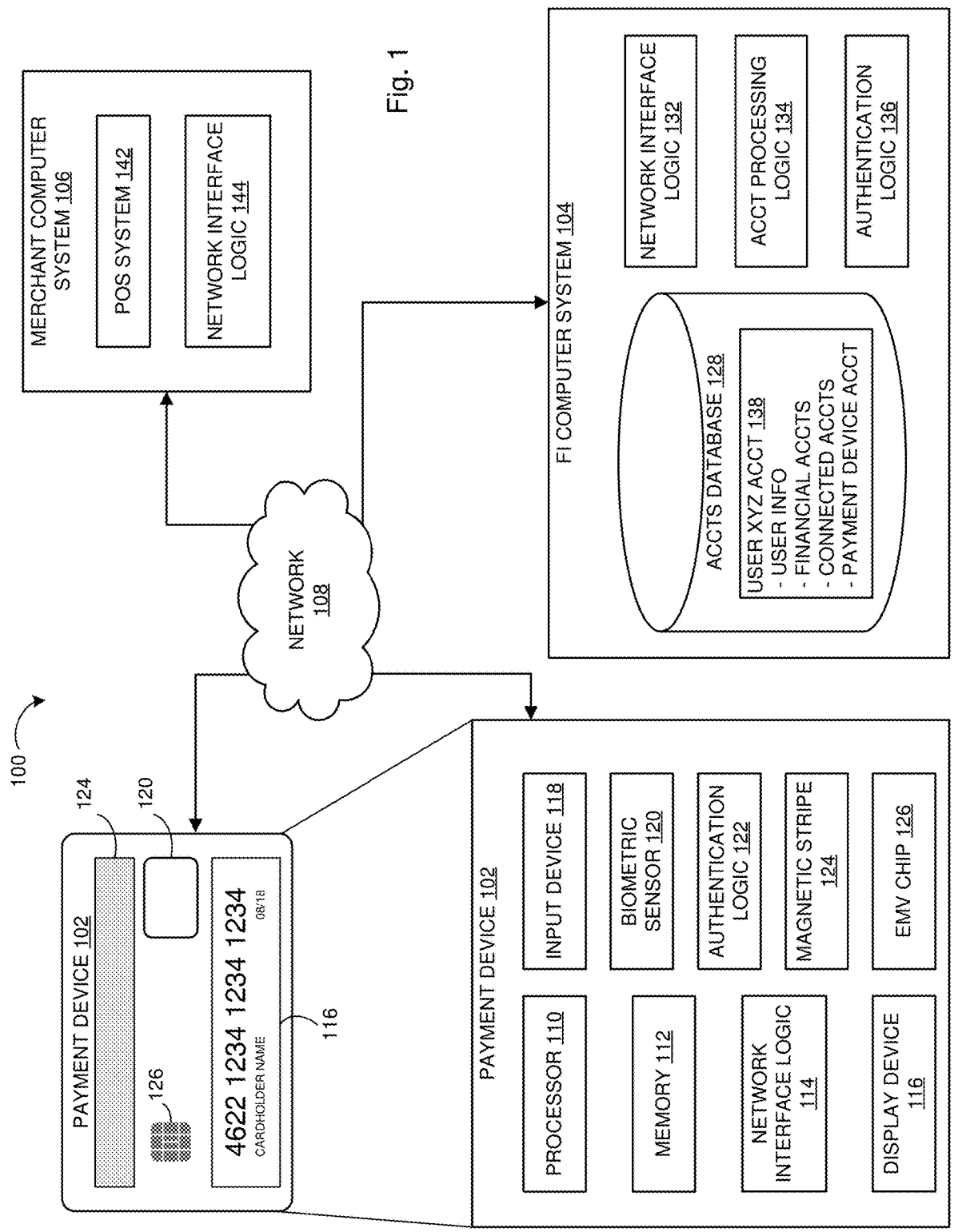
FIG. 1 is a block diagram of a computer-implemented payment processing system, according to an example embodiment.

Before turning to the figures which illustrate example embodiments, it should be understood that the application is not limited to the details or methodology set forth in the following description or illustrated in the figures. It should also be understood that the phraseology and terminology employed herein is for the purpose of description only and should not be regarded as limiting.

Referring generally to the figures, systems and methods for providing and managing payment devices with enhanced security features are described. In one embodiment, a payment device is associated with a payment account of a user or customer. The payment device includes an integral display that is normally blank (e.g., that does not display any information or that displays only non-sensitive information). The display is configured to selectively display account information (e.g., a credit card primary account number (PAN)) for only a limited time period after the user is authenticated by the payment device. Upon expiration of that time period, the display removes the account information and reverts to a blank state. In some example embodiments, the display removes only sensitive payment account information (e.g., PAN) and continues to display other information (e.g., user last name).

In one embodiment, the payment device includes an embedded biometric sensor structured to receive a biometric measurement from the user. The payment device or a backend system may authenticate the user by verifying that the biometric measurement matches a stored biometric of the user. Authentication may be valid only for a limited time or based on other factors, such as for only a limited number of payment requests. In other embodiments, the user may be authenticated in other ways, such as via a password, PIN, etc.

The payment device may be used to execute payment transactions in a manner similar to that of a credit card, debit card, or mobile wallet. Payment requests via the payment device are approved only if the user is authenticated at the time that the payment request is initiated. In one embodiment, the payment device may be configured to define an authentication data value so as to indicate that the user is authenticated. The authentication data value may be included in an issuer discretionary data field of at least one of track 1 and track 2 data of a magnetic strip card, within a response to an authorization request of an EMV (Europay-MasterCard-Visa) card, or within or along with a payment token for a mobile wallet. A backend financial institution (FI) computer system may analyze the authentication data value as an additional factor in approving or denying payment requests.

Therefore, according to various embodiments, the payment device described herein prevents fraud in situations in which the user is required to temporarily give possession of the payment device to a third-party (e.g., a waiter at a restaurant) by making it more difficult for a fraudster to surreptitiously copy the user's PAN and use it to make fraudulent purchases. Additionally, fraud is prevented because transaction requests from the payment device are approved only if the user has recently been authenticated via the payment device.

For example, in a restaurant environment, the user may authenticate his or her payment card. After a first time period (e.g., a short time period between authenticating and handing the payment card to the server), the sensitive payment information (e.g., the PAN) is removed from the card. In some examples, some non-sensitive information (e.g., the user's last name) may continue to be displayed. Although the sensitive payment account information is removed from the card, the card remains activated up to a second time period after authenticating. Accordingly, the server can still run the card, but cannot view the sensitive payment account information on the card. After the second time period, the card is deauthenticated, and payments cannot be made from the card. For example, if the user forgot the payment card at the restaurant, the user would not have to worry about a fraudster obtaining and using the card. Instead, the card would be non-functional until it was authenticated again by the user.

In some embodiments, the payment device is associated with a single user. However, in other embodiments, the payment device may be reprogrammable for use by a plurality of users. For example, the payment device may normally be in a non-active state, and may be programmed for limited use (e.g., for a limited time period, limited number of transactions, limited merchants or payment recipients, limited geographic location, etc.). After expiration of the limited use parameters, the payment device is erased and reverts back to its blank, non-active state.

For example, in one embodiment, users may create and manage payment device accounts. The payment device accounts may include an associated payment account (e.g., demand deposit account (DDA), credit card account, etc.) and user authentication credentials. The user authentication credentials may include, for example, a biometric, a username/password combination, etc. The user may activate a payment device by entering his or her login credentials, for example, by scanning a biometric via a biometric sensor on the payment device. The backend system may validate that the biometric measurement matches a stored biometric of the user to authenticate the user. Upon authenticating the user, the backend system may program the payment device for use by the user by transmitting the user's payment account information of the user's payment device account to the payment device. The payment device may be used by the user for a limited period to execute payment transactions. Upon expiration of the limited period, the user's account information is erased from the payment device so that no other users can execute transactions involving the user's payment accounts. In one aspect, the payment device is a generic device or card that is tied to a user in real-time or near real-time. It should be understood that the systems and methods described herein are not limited to payment devices. Instead, systems and methods described herein may similarly be utilized in connection with other types of cards or devices, such as identification cards, access cards, etc.

In some embodiments, for example, merchants may keep "blank" payment devices that can be temporarily programmed by users and used to execute payment transactions. Accordingly, users need not carry payment devices or worry about forgetting or losing payment devices. Furthermore, various entities, such as merchants, FIs, card issuers, loyalty program providers, etc., may include additional features, such as offers, discounts, rewards, account balances, etc., on the payment devices. Therefore, according to various embodiments, the payment device provides a flexible and secure payment system that alleviates security concerns associated with forgetting or losing payment devices, while also providing additional functionality to related entities, such as merchants. In addition, users can borrow other users' cards without fear of sharing private account information. In some embodiments, the payment device account may be a mobile wallet account. Accordingly, such embodiments enable users to access their mobile wallet accounts from other blank payment devices.

Referring to FIG. 1, a block diagram of a computer-implemented payment processing system 100 is illustrated, according to an example embodiment. The payment processing system 100 may be used to set up and utilize a payment device. The user may be a business entity and/or an individual consumer that has one or more source accounts with an FI. The source accounts may include business or consumer DDAs, credit card accounts, debit card accounts, lines of credit, and so on. The payment device account may be created for the user to transmit funds from a source account to pay an entity (e.g., a merchant) for goods or services, or for other reasons. Additionally, funds can be transferred from the source account to another person.

The payment processing system 100 may include, among other devices and systems, a payment device 102, an FI computer system 104, and a merchant computer system 106. The various systems may communicate through a network 108, which may include one or more of the Internet, cellular network, Wi-Fi, Wi-Max, a proprietary banking network, or any other type of wired or wireless network.

The FI computer system 104 and the merchant computer system 106 may each include a computer system (e.g., one or more servers each with one or more processing circuits), each including a processor and memory. The processors may be implemented as application specific integrated circuits (ASICs), one or more field programmable gate arrays (FPGAs), a group of processing components, or other suitable electronic processing components. The memory may be one or more devices (e.g., RAM, ROM, Flash memory, hard disk storage, etc.) for storing data and/or computer code for completing and/or facilitating the various processes described herein. The memory may be or include non-transient volatile memory, non-volatile memory, and/or non-transitory computer storage media. The memory may include data base components, object code components, script components, or any other type of information structure for supporting the various activities and information structures described herein. The memory may be communicably connected to the processor and include computer code or instructions for executing one or more processes described herein. The FI computer system 104 and the merchant computer system 106 may each include server-based computer systems, for example, comprising one or more networked computer servers that are programmed to perform the operations described herein. In another example, the FI computer system 104 and the merchant computer system 106 may each be implemented as a distributed computer system where each function is spread over multiple computer systems.

The payment device 102 may be used by a user (e.g., a business owner or employee, a consumer, etc.) in connection with a payment device account. For example, in some embodiments, the user may be a customer of an FI. The payment device account may be established in a variety of ways, for example, through a brick-and-mortar bank branch or through an online banking area of a website of the FI (e.g., banking institution) that operates the FI computer system 104. Payment device accounts may include one or more associated payment accounts or source accounts (e.g., credit card accounts, debit card accounts, business or consumer DDAs, lines of credit, gift cards, etc.). The payment device account may also include user authentication credentials. The user authentication credentials may include, for example, a username/password combination, a biometric (e.g., fingerprints, hand geometry, earlobe geometry, retina and iris patterns, voice waves, keystroke dynamics, DNA and signatures, etc.), etc., or a combination thereof. In some embodiments, multiple users may be associated with a single payment device account. The payment device account may specify different user profiles, associations, limits, purchase restrictions, etc. For example, a parent can include a child in his or her payment device account. The payment device account may be configured to automatically provision a certain amount of money on a regular basis (e.g., a monthly allowance) to be used by the child. The payment device account may allow the child may spend only the specified amount of money, and prevent access to the parent's entire account balance or spending limit. Various other restrictions may include budget restrictions, time restrictions, location restrictions, etc. In addition, payments may be split between different payment accounts within the payment device account.

As depicted in FIG. 1, the payment device 102 may be sized similar to or the same as a credit card or debit card. For example, in one embodiment, the payment device 102 complies with the credit card dimension specifications (ID-1) set forth in ISO/IEC 7810. In other embodiments, the payment device 102 may be slightly thicker than a conventional credit card to accommodate various electrical components. Although not shown in FIG. 1, the payment device 102 may be embodied in different forms and shapes. For example, in some embodiments, the payment device 102 includes a mobile wallet application installed on a mobile electronic device, such as a cellular phone, smartphone, mobile handheld wireless e-mail device, personal digital assistant, portable gaming device, or other suitable device.

According to an embodiment, the payment device 102 includes one or more of a processor 110, memory 112, network interface logic 114, a display device 116, an input device 118, a biometric sensor 120, authentication logic 122, a magnetic stripe 124, and an integrated circuit (e.g., EMV chip) 126. In some embodiments, the processor 110 and memory 112 are powered via a battery. However, in other embodiments, the processor 110 and memory 112 are powered by an electromagnetic field transmitted by another device.

The network interface logic 114 may include program logic that facilitates operative communication between the payment device 102 and other devices. For example, in various embodiments, the payment device 102 includes a near field communication (NFC) circuit to provide short-range communication between the payment device 102 and other devices, such as a merchant point-of-sale (POS) device. In other embodiments, the payment device includes any of various types of wireless network transceivers (e.g., 802.11X, Bluetooth, NFC, Bluetooth Low Energy (BLE), RFID, ZigBee, etc.), cellular transceivers (e.g., CDMA, GSM, LTE, etc.), or a combination thereof (e.g., both a cellular transceiver and a Bluetooth transceiver). Accordingly, the network interface logic 114 may facilitate communication between the payment device 102 and another device, either directly between the devices or via the network 108.

The display device 116 may be used to display various types of information, such as payment account information (e.g., PAN, expiration date, card security code (e.g., CVV2, CVC2, CSC, CID, etc.), account holder name, signature, etc.), personally identifying information (e.g., name, signature, picture, address, etc.), or other information. For example, the display device 116 may provide a digital readout of a credit card number, expiration date, and card security code for online or card not present transactions. The display device 116 may also be used by a user to scroll through and select one of multiple payment accounts to be used in connection with the payment device 102. According to some embodiments, the display device 116 is normally blank in the sense that it does not display any information, such as payment account information, personally identifying information, etc. As will be appreciated, the display device 116 may be configured to display such information for only a limited period. The display device 116 may be a bi-state display, such as electronic paper (e.g., electrophoretic ink (e-Ink) or Gyricon®). Bi-state displays require power to change the display content but typically do not require power to retain the existing display content. In other words, in implementations in which the display device 116 is a bi-state display, the display device 116 will stay in the state in which it was written until power and data are subsequently applied. In other implementations, the display device 116 includes a liquid crystal display (LCD), a light-emitting diode display (LED), or other types of display technologies, which require power to operate.

The input device 118 may include any of touchscreen displays, buttons, speakers, keyboards, notification LEDs, microphones, sensors, switches, cameras, or a combination thereof. For example, the input device 118 may include a "wake" button to wake the payment device 102 from a "sleep" state. Waking the payment device 102 may activate the biometric sensor 120 such that the biometric sensor 120 is ready to acquire a biometric measurement. In another example, the input device 118 may include buttons that allow a user to scroll through multiple payment accounts in order to select a payment account to be used for a transaction. In some embodiments, the input device 118 may be effectively provided via operative communication with other devices, such as the user's smartphone. In other words, in some embodiments, the user may configure and control the payment device 102 via the user's smartphone.

The biometric sensor 120 may include any of a fingerprint sensor, a retina scanner, a microphone (e.g., for voice fingerprint recognition), a camera (e.g., for facial recognition), etc. The biometric sensor 120 may be configured to take a biometric measurement from the user in order to authenticate the user's identity. In some embodiments, a biometric measurement may be captured by another device (e.g., a smartphone), and transmitted to the payment device 102 or to another system or device, such as the FI computer system 104, to authenticate the user's identity. In some embodiments, the biometric sensor 120 may be configured to detect a user's pulse to identify if the user is being forced or coerced into programming the payment device 102 against the user's will.

In some embodiments, the payment device 102 is initially activated via the biometric sensor 120. For example, when a user receives a new payment device 102 in the mail, the user may scan a biometric (e.g., fingerprint) via the biometric sensor 120 on the payment device 102. The scanned biometric may be transmitted to a backend system, such as the FI computer system 104, and compared to a stored biometric of the user. If the scanned biometric matches the stored biometric, the backend system activates the payment device 102.

The authentication logic 122 is configured to authenticate or verify the user's identity. The authentication logic 122 may verify the user's identity based on various factors, such as passwords or personal identification numbers (PINs) received via the input device 118, biometrics captured by the biometric sensor 120, etc., or any combination thereof. In one embodiment, upon setting up the payment device account, the user captures a biometric measurement, which may be stored in the memory 112 of the payment device, or may be stored in a remote database (e.g., within the FI computer system 104). The authentication logic 122 is configured to compare subsequently-acquired biometric measurements with the user's stored biometric in order to authenticate the user. Biometrics may include, for example, fingerprints, hand geometry, earlobe geometry, retina and iris patterns, voice waves, keystroke dynamics, DNA, signatures, etc. Some embodiments may include multi-factor authentication, such as requiring both a PIN and a biometric.

In some embodiments, the authentication logic 122 is included in the payment device 102. However, in other embodiments, some or all of the functionality of the authentication logic 122 may reside in other systems, such as the FI computer system 104. For example, in one embodiment, a user scans his or her fingerprint via the biometric sensor 120 on the payment device 102. The payment device 102 transmits (via the network interface logic 114) the scanned fingerprint to the FI computer system 104. Authentication logic within the FI computer system 104 compares the scanned fingerprint to a stored fingerprint of the user to verify the user's identity. The FI computer system 104 then transmits a message to the payment device 102 indicating that the user is successfully authenticated. In such embodiments, the information transmitted between the payment device 102 and the FI computer system 104 may be encrypted, tokenized, or otherwise secured.

The magnetic stripe 124 and the integrated circuit 126 may each be programmable based on a selected payment account (e.g., credit card, DDA, etc.) stored in the user's payment device account. In one embodiment, the payment device 102 includes a magnetic stripe or EMV emulator for programming and reprogramming the magnetic stripe 124 and/or the integrated circuit 126 with users' account information. In some embodiments, at least one of the magnetic stripe 124 and the integrated circuit 126 may rotate the card security code to ensure card safety. In some embodiments, certain card security code and card number pairs may be left open for recurring transactions.

In effect, the programmable magnetic stripe 124 and the integrated circuit 126 are structured such that using the payment device 102 feels the same to the user as using a conventional credit card or debit card. It should be noted that, as described above, the network interface logic 114 may also facilitate NFC communications, which may be used in addition to or instead of the magnetic stripe 124 and the integrated circuit 126 to conduct transactions. In some embodiments, the payment device 102 includes only one of the magnetic stripe 124 and the integrated circuit 126. In other embodiments, the payment device 102 includes neither the integrated circuit 126 nor the magnetic stripe 124, and is configured to conduct transactions via NFC communications managed by the network interface logic 114.

The FI computer system 104 includes an accounts database 128, network interface logic 132, account processing logic 134, and authentication logic 136. In some embodiments, as illustrated in FIG. 1, the FI computer system 104 manages the accounts database 128 in whole or in part. However, in other embodiments, the accounts database 128 may be managed in whole or in part by a different entity. The accounts database 128 is configured to store information regarding various users' accounts. By way of example, information for a specific account 138 of a specific user or customer is shown as being stored in the accounts database 128. As will be appreciated, the accounts database 128 may also store information regarding many other accounts (not shown) of other users. The accounts 128 may include user identifying information (e.g., login credentials, biometrics, address, etc.), financial account information (e.g., credit or debit card accounts, DDA accounts, brokerage accounts, etc.), other connected account information (e.g., loyalty program accounts, membership accounts, etc.), payment device 102 information (e.g., IP address of the payment device) security preferences, etc., of the associated user or account owner.

During registration process for the payment device account, the user associated with the payment device account may be prompted to identify a financial account that is, a source of funds for the payment device account. The financial account may be an existing DDA or a credit card account held by the user with the same FI or another FI. When the payment device account is created, the user is prompted to provide bank account information (e.g., routing number and/or account number) for the financial account that is used as a source of funds for the payment device account. In some embodiments, a user may have multiple financial accounts associated with a single payment device account. The financial accounts may be managed by the same or different FIs.

The network interface logic 132 is configured to facilitate communication between the FI computer system 104 and the various other devices and systems illustrated in FIG. 1 over the network 108. The account processing logic 134 is configured to manage transactions involving the user's financial account. The authentication logic 136 is configured to verify and authenticate the user, as described above. As noted, authentication may be performed by one or both of the authentication logic 122 of the payment device 102 and the authentication logic 136 of the FI computer system 104.

The merchant computer system 106 includes a POS system 142 and network interface logic 144. The merchant computer system 106 may be used at a POS location to conduct transactions with users. The merchant may have a brick-and-mortar store or may be an e-commerce store. For example, the merchant computer system 106 may include a POS system 142 such as a cash register system connected to a central server system operated by the merchant. As another example, the POS system 142 may include a mobile computing device (e.g., smart phone, tablet PC, etc.) operated by a store clerk as the clerk moves throughout the store. Again, the mobile computing device in such an embodiment may connect to a central server system operated by the merchant. The network interface logic 144 is configured to facilitate communication between the merchant and the various other devices and systems illustrated in FIG. 1 over the network 108. For example, the network interface logic 144 may send transaction requests to the FI computer system 104, and receive transaction approvals from the FI computer system 104. The network interface logic 144 may also facilitate communication between the merchant computer system 106 and local devices. For example, if the payment device 102 is located within the merchant's store, the network interface logic 144 may facilitate communication between the merchant computer system 106 and the payment device 102.

As previously mentioned, some embodiments include payment devices 102 that are reprogrammable for use by a plurality of users. For example, a merchant may have multiple payment devices 102 available for use by users. According to one example use case, a user picks up a reprogrammable payment device and inputs identifying information (e.g., a biometric, password, etc.). The payment device 102 is in operable communication with the merchant computer system 106 (e.g., via a wireless network connection managed by the network interface logic 144). The payment device 102 encrypts or tokenizes the identifying information and transmits it to the FI computer system 104. The FI computer system 104 authenticates the user by determining that the received identifying information matches the user's identity information stored in the user's account 138. Upon authenticating the user, the FI computer system 104 transmits encrypted or tokenized information relating to the user's payment device account to the merchant computer system 106. The merchant computer system 106 transmits the user's encrypted or tokenized payment device account information via the network interface logic 144, to the payment device 102. The user's payment device account information may include one or more payment tokens. The payment device 102 is now activated for use by the user to conduct transactions with the merchant. The payment device 102 may have various limited use parameters. Upon expiration of the limited use parameters or upon manual deactivation by the user, the payment device 102 is deactivated and the user's account information is deleted.

Figure 2A:
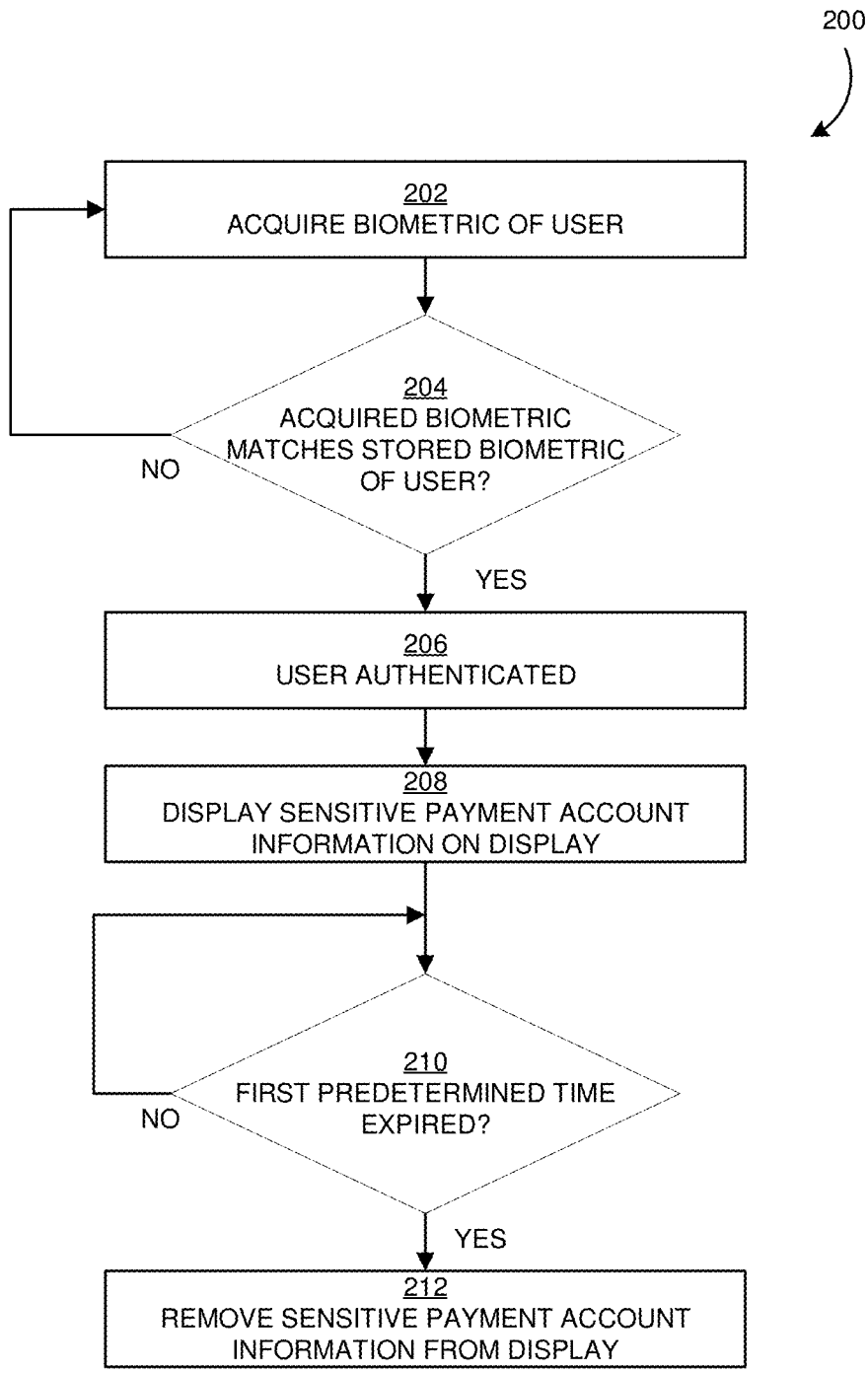
FIGS. 2A, 2B, and 3 are flow diagrams of methods of operating a payment device, according to various example embodiments.

Turning to FIG. 2A, a flow diagram of a method 200 of operating a payment device is illustrated, according to an embodiment. For clarity and brevity, the method 200 is discussed below in connection with the payment processing system 100 of FIG. 1, including the payment device 102. However, it should be understood that the method 200 may be performed by other systems and devices. In general, the method 200 involves (1) authenticating a user (e.g., via a biometric measurement acquired by a payment device); (2) displaying sensitive payment account information on the payment card upon authenticating the user; and (3) removing the sensitive payment account information from the payment card after a first predetermined time period. Accordingly, the method 200 is used with a payment device that is normally in a blank state, and that displays sensitive account information for only a limited time upon the user being authenticated. To that end, payment devices implementing the method 200 prevents fraudsters from copying sensitive payment account information if the payment device is lost or otherwise visible to unauthorized users.

At 202, the payment device 102 receives a biometric measurement from the biometric sensor 120. The biometric measurement may include any fingerprints, hand geometry, earlobe geometry, retina and iris patterns, voice waves, keystroke dynamics, DNA and signatures, etc., or a combination thereof. In some embodiments, the biometric sensor 120 is embedded in the payment device 102. In such embodiments, the payment device 102 may first need to "wake" from a "sleep" state, via, for example, a user input (e.g., button press). In other embodiments, the biometric sensor 120 may be on a device other than the payment device 102, such as the user's smartphone, for example. In such embodiments, the biometric measurement is captured on the other device and transmitted (e.g., via Bluetooth, BLE, NFC, Wi-Fi, etc.) to the payment device 102. In some embodiments, credentials other than a biometric, such as a password, PIN, etc., are used instead of or in addition to a biometric.

At 204, the authentication logic 122 of the payment device 102 determines whether the biometric measurement matches a stored biometric of the user. Step 204 may be performed in whole or in party by the payment device 102 or by another device or system. For example, in one embodiment, the payment device 102 encrypts or tokenizes the biometric measurement, and transmits the encrypted or tokenized biometric measurement to the FI computer system 104 or another system. The authentication logic 122 of the FI computer system 104 may determine whether the biometric measurement matches a stored biometric of the user. The FI computer system 104 may then transmit a response to the payment device 102 indicating whether or not the user is authenticated.

At 206, the user is authenticated if the answer to step 204 is "YES." In other words, the user is authenticated if the biometric measurement matches the stored biometric of the user. If the answer to step 204 is "NO," the user is not authenticated, and the payment device 102 must acquire another biometric measurement from the user. In some embodiments, upon the user being authenticated at 206, the payment device 102 is configured to define an authentication data value so as to indicate that the user is authenticated. The authentication data value may be included in an issuer discretionary data field of at least one of track 1 and track 2 data of a magnetic strip card, within a response to an authorization request of an EMV (Europay-MasterCard-Visa) card, or within or along with a payment token for a mobile wallet.

At 208, upon the user being authenticated at 206, sensitive payment account information is displayed on the display device 116 of the payment device 102. The sensitive payment account information may include any information that can personally identify the user or the user's financial accounts. For example, the sensitive payment account information may include a PAN, expiration date, card security code (e.g., CVV2, CVC2, CSC, CID, etc.), loyalty account information, account holder name, signature, personally identifying information (e.g., name, signature, picture, address, social security number, etc.), or other information.

At 210, it is determined whether a first predetermined time period has expired. The first predetermined time period may define an amount of time that the sensitive payment account information is displayed on the display device 116 before it is removed. The first predetermined time period may begin tolling upon the user being authenticated at 206. The sensitive payment account information is removed from the display device 116 after completion of the first predetermined time period. The first predetermined time period may include any amount of time, and may be user-configurable. For example, in one embodiment, the first predetermined time period is three seconds. In another embodiment, the first predetermined time period is thirty seconds. The sensitive payment account information is displayed on the display device 116 until the answer to step 210 is "YES."

At 212, the sensitive payment account information is removed from the display if, at step 210, it is determined that the first predetermined time period has expired. Upon removing the sensitive payment account information, the display device 116 remains blank until the user is re-authenticated.

Figure 2B:
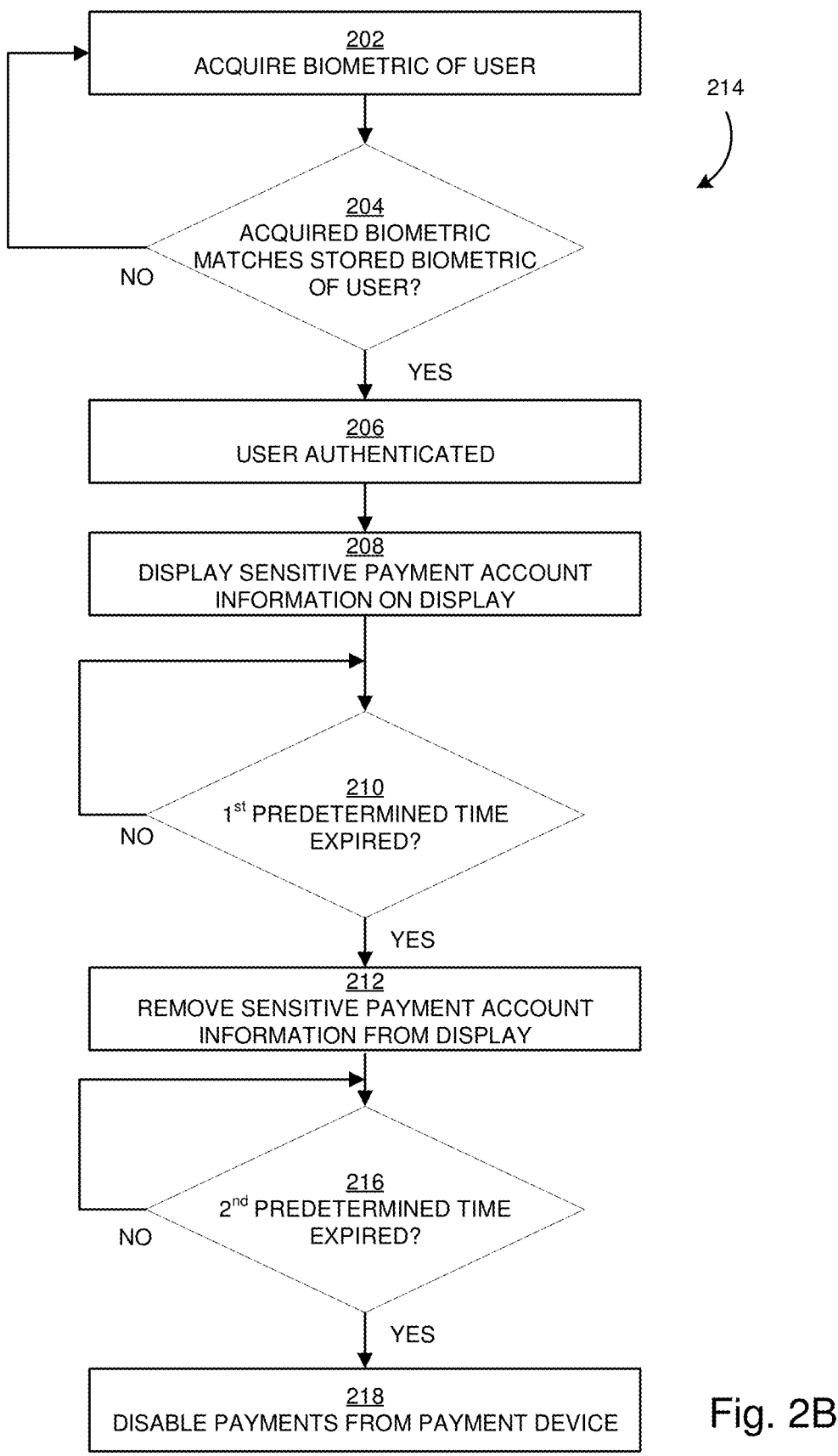

FIG. 2B a flow diagram of a method 212 of operating a payment device is illustrated, according to an embodiment. The method 212 of FIG. 2B is similar to the method 200 of FIG. 2A. In fact, steps 202-212 may be the same in FIGS. 2A and 2B. However, the method 212 of FIG. 2B includes the additional steps 216 and 218.

The method 212 of FIG. 2B is similar to the method 200 of FIG. 2A; however the method 212 of FIG. 2B provides further security measures by deactivating the payment device a second predetermined time period after the device being authenticated. Accordingly, payment devices performing the method 212 are more secure than other payment devices because they require authentication before use.

At 216, it is determined whether a second predetermined time period has expired. The second predetermined time period may define an amount of time that the payment device 102 remains authenticated. The second predetermined time period begins tolling upon authenticating the user. The second predetermined time period may be longer than, equal to, or shorter than the first predetermined time period. The second predetermined time period may include any amount of time, and may be user-configurable. For example, in one embodiment, the second predetermined time period is one minute. In another embodiment, the second predetermined time period is five minutes. One example of an application in which it would be desirable for the second predetermined time period to be longer than the first predetermined time period is paying for a bill at a restaurant or bar. In this situation, it is desirable for sensitive payment information to be removed prior to handing the payment device to the server so as to prevent the server from surreptitiously copying the sensitive payment information. However, the payment device must still be activated for additional time so that the server can use (e.g., swipe, dip, scan, touch, etc.) the payment device to complete the transaction. The payment device is then deactivated after the second predetermined time in order to prevent fraudsters from using the payment device if it is lost or stolen.

At 218, payments from the payment device 102 are disabled if, at 216, it is determined that the second predetermined time period has expired. In other words, at 218, the user is de-authenticated, meaning that the authentication from step 206 has expired. Payments may be disabled from the payment device 102 in various ways. In one embodiment, the magnetic stripe 124 and/or the integrated circuit 126 may be reprogrammed (e.g., to a non-functional account number, a NULL value, etc.) to disable payments. In other embodiments, to de-authenticate the user, the payment device 102 may define the authentication data value so as to indicate that the user is not authenticated. As noted above, the authentication data value may be defined within the data fields or data objects, which may be transmitted in connection with payment requests to be made using the payment device 102. Accordingly, the payment processor (e.g., the FI computer system 104) may be configured to deny payment transaction requests unless the authentication data value indicates that the user is authenticated. In other words, payment requests initiated by use of the payment device 102 are approved only if the user is authenticated at the time that the payment request is initiated.

Furthermore, in some embodiments, the payment processor is configured to deny payment transaction requests that are not the first payment request that is initiated subsequent to the user being authenticated. In other words, the user must be authenticated before initiating each payment request in order for the payment requests to be allowable. To do so, the authentication data value may be time stamped. The payment processor may review the time stamp of the authentication data value in connection with a current payment request, as well as time stamps of previous payment requests. If a previous payment request was made since the user was most recently authenticated, the current payment request will be denied.

Figure 3:
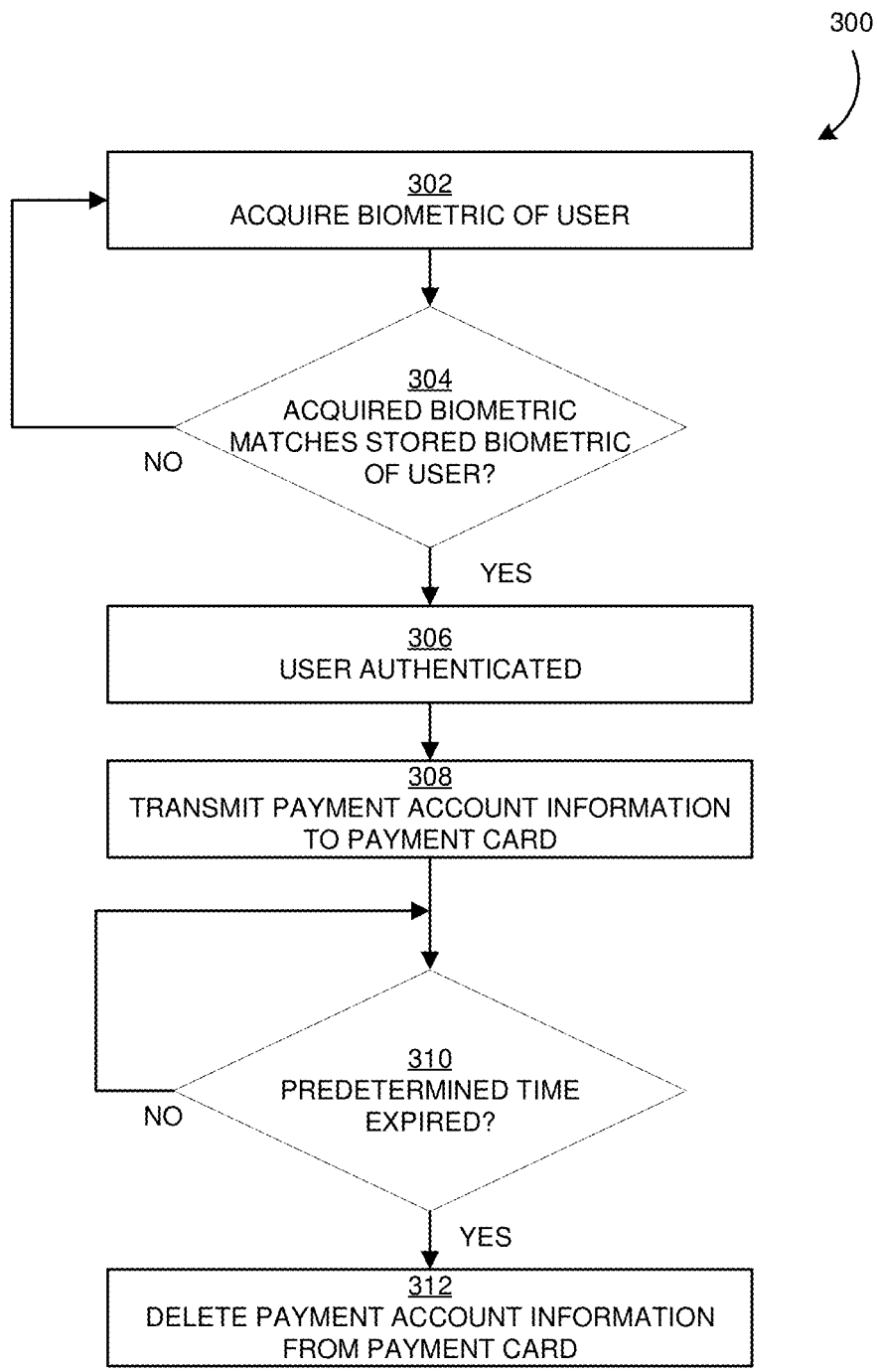

Turning to FIG. 3, a flow diagram of a method 300 of operating a payment device is illustrated, according to an embodiment. Specifically, the method 300 is performed in embodiments in which the payment device 102 is reprogrammable for use by a plurality of users. For clarity and brevity, the method 300 is discussed below in connection with the payment processing system 100 of FIG. 1, including the payment device 102. However, it should be understood that the method 300 may be performed by other systems and devices. According to the method 300, a payment device account is associated with a first user of the payment system. The payment device account includes an associated payment account and a biometric indicator of the first user. The payment device 102 is normally in a deactivated state and may be activated for temporary use by a user having a payment device account.

At 302, a biometric measurement of the user is acquired. At 304, it is determined whether the acquired biometric matches a stored biometric of the user. At 306, the user is authenticated if the answer to step 304 is "YES." Steps 302-306 may be performed generally similar to steps 202-206 of FIGS. 2A and 2B. However, in some embodiments, steps 304 and 306 may be performed by the merchant computer system 106 rather than by the FI computer system 104. For example, the payment device 102 may be in operative communication with the merchant computer system 106 via a wireless connection. Alternatively, the FI computer system 104 or other systems, or any combination of systems, may also perform those steps.

At 308, payment account information of the payment account of the first user is transmitted to the payment device 102. The payment account information may include a PAN, expiration date, card security code (e.g., CVV2, CVC2, CSC, CID, etc.), loyalty account information, etc. Upon receiving the payment account information, the payment device 102 is activated, and the user may use the payment device 102 to perform financial transactions.

At 310, it is determined whether a first predetermined time period has expired. The first predetermined time period may define an amount of time that the payment device 102 is activated. The first predetermined time period may include any amount of time, and may be user-configurable. For example, in one embodiment, the first predetermined time period is thirty minutes. In another embodiment, the first predetermined time period is three hours. The payment device 102 is activated until the answer to step 310 is "YES."

At 312, the payment account information is deleted from the payment device 102 if, at step 310, it is determined that the first predetermined time period has expired. The first predetermined time period begins tolling upon authenticating the user. After completion of the first predetermined time period, the payment device 102 is deactivated. Once the payment device 102 is deactivated, it cannot be used to conduct transactions. Furthermore, the user's payment account information is deleted such that it cannot be received by a third-party. After the user's payment account information is deleted from the payment device 102, the payment device 102 may be reprogrammed with payment account information of other users. In some embodiments, the payment device 102 includes offers or discounts that are not deleted when the user's payment account information is deleted.

In some embodiments, the payment device 102 may be deactivated in various other ways. For example, the payment device 102 may be automatically deactivated upon executing a payment transaction. In other embodiments, the payment device 102 is deactivated if a detected geolocation of the payment device 102 is over a predetermined distance from the user (e.g., via a geolocation measurement from the user's smartphone).

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions. Software implementations could be accomplished with standard programming techniques with rule based logic and other logic to accomplish the various connection steps, processing steps, comparison steps and decision steps.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products embodied on tangible media.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The claims should not be read as limited to the described order or elements unless stated to that effect. It should be understood that various changes in form and detail may be made by one of ordinary skill in the art without departing from the spirit and scope of the appended claims. All implementations that come within the spirit and scope of the following claims and equivalents thereto are claimed.

What is claimed is:

1. A method for using a payment device, the payment device comprising a biometric sensor, a display, a processor, and a memory, the method comprising:

storing, by the processor, a biometric of a user, payment account information of the user, a first time period, and a second time period in the memory;

receiving, by the processor, a biometric measurement from the user via the biometric sensor;

storing, by the processor, the biometric measurement in the memory;

determining, by the processor, that the stored biometric measurement matches the stored biometric of the user;

based on the determination that the stored biometric measurement matches the stored biometric of the user, authenticating the user by the processor;

based on the authentication, displaying, by the processor, payment account information relating to a payment account of the user on the display, the payment account being associated with the payment device;

based on the authentication, determining, by the processor, that the first time period has expired and, based on the determination that the first time period has expired, removing the payment-account information from the memory;

subsequently determining that the second time period has expired and, based on the determination that the second time period has expired, deactivating the payment device.

2. The method of claim 1, further comprising approving, by the processor, a payment request based on the user being authenticated.

3. The method of claim 1, wherein the payment device includes at least one of a magnetic stripe and an integrated circuit.

4. The method of claim 3, further comprising reprogramming, by the processor, the at least one of the magnetic stripe and the integrated circuit to a non-functional payment account number after the second time period.

5. The method of claim 4, further comprising reprogramming, by the processor, the at least one of the magnetic stripe and the integrated circuit to the payment account number of the payment account of the user.

6. The method of claim 1, further comprising:
associating, by the processor, a plurality of payment accounts with the payment device;
receiving, by the processor, a selection of one of the plurality of payment accounts; and
transferring, by the processor, a payment to a recipient from the selected one of the plurality of payment accounts.

7. The method of claim 6, further comprising associating, by the processor, a merchant loyalty account with the payment device.

8. A computer-implemented method performed by a payment device having a biometric sensor, a display, a processor, and a memory, the method comprising:
associating, by the processor, the payment device with a payment account of a user;
storing, by the processor, a biometric of the user, payment account information of the user, a first time period, and a second time period in the memory;
measuring, by the processor, a biometric measurement of the user using the biometric sensor;
storing, by the processor, the biometric measurement in the memory;
determining, by the processor, that the stored biometric measurement matches the stored biometric of the user;
based on the determination that the stored biometric measurement matches the stored biometric of the user, authenticating the user by the processor;
based on the authentication, displaying, by the processor, payment account information on the display, the payment account information relating to the payment account of the user;
based on the authentication, determining, by the processor, that the first time period has expired and, based on the determination that the first time period has expired, removing the payment account information from the memory; and
subsequently determining that the second time period has expired and, based on the determination that the second time period has expired, deactivating, by the processor, the payment device.

9. The method of claim 8, wherein the payment device includes at least one of a magnetic stripe and an integrated circuit, the magnetic stripe and the integrated circuit are each reprogrammable with payment account data including a payment account number of the payment account of the user, and the method further comprising:
reprogramming, by the processor, the at least one of the magnetic stripe and the integrated circuit to the payment account number of the payment account of the user.

10. The method of claim 8, further comprising:
associating, by the processor, a plurality of payment accounts with the payment device;
receiving, by the processor, a selection of one of the plurality of payment accounts; and
transferring, by the processor, a payment to a recipient from the selected one of the plurality of payment accounts.

11. The method of claim 10, further comprising associating, by the processor, a merchant loyalty account with the payment device.

12. The method of claim 1, wherein the payment device further includes a magnetic stripe being reprogrammable with payment account data, and the method further comprises reprogramming the magnetic stripe by rotating the card security code.

13. The method of claim 1, further comprising rotating the card security code and a card number pair among a number of pairs.

* * * * *